(12) United States Patent
Morita

(10) Patent No.: US 11,578,161 B2
(45) Date of Patent: Feb. 14, 2023

(54) RESIN COMPOSITION AND DISPLAY DEVICE INCLUDING ADHESIVE LAYER FORMED FROM THE SAME

(71) Applicant: Samsung Display Co., Ltd., Yongin-si (KR)

(72) Inventor: Keisuke Morita, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 53 days.

(21) Appl. No.: 17/388,687

(22) Filed: Jul. 29, 2021

(65) Prior Publication Data

US 2022/0204672 A1 Jun. 30, 2022

(30) Foreign Application Priority Data

Dec. 30, 2020 (KR) ........................ 10-2020-0187705

(51) Int. Cl.
*C08F 220/34* (2006.01)
*C08F 220/20* (2006.01)
(Continued)

(52) U.S. Cl.
CPC ............ *C08F 220/346* (2020.02); *C08F 2/50* (2013.01); *C08F 220/1808* (2020.02); *C08F 220/20* (2013.01); *C08G 18/3885* (2013.01); *C08G 18/6208* (2013.01); *C08G 18/672* (2013.01); *C08G 18/69* (2013.01); *C09J 4/00* (2013.01); *G02F 1/133305* (2013.01); *C08G 2115/00* (2021.01); *G02F 2202/28* (2013.01)

(58) Field of Classification Search
CPC ............ C08F 220/346; C08F 220/1808; C08F 220/20; C08G 18/672; C08G 18/69; C08G 18/3885
See application file for complete search history.

(56) References Cited

U.S. PATENT DOCUMENTS 7,829,605 B2    11/2010    Watanabe et al.
8,673,108 B2    3/2014    Liang et al.
(Continued)

FOREIGN PATENT DOCUMENTS

JP    4459880    4/2010
JP    5210631    6/2013
(Continued)

*Primary Examiner* — Michael L Leonard
(74) *Attorney, Agent, or Firm* — Kile Park Reed & Houtteman PLLC

(57) ABSTRACT

Provided is a resin composition including at least one (meth)acrylate monomer, a urethane (meth)acrylate oligomer, and at least one photo initiator. The urethane (meth)acrylate oligomer includes a phosphate ester group and is represented by Formula 1. Accordingly, the resin composition may exhibit satisfactory compatibility before curing and may exhibit excellent adhesion after curing.

[Formula 1]

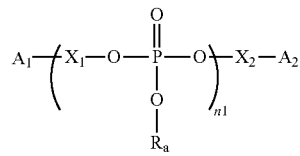

20 Claims, 5 Drawing Sheets

(51) Int. Cl.
*C08G 18/62* (2006.01)
*C08G 18/38* (2006.01)
*C08G 18/67* (2006.01)
*C08F 2/50* (2006.01)
*C08G 18/69* (2006.01)
*C09J 4/00* (2006.01)
*C08F 220/18* (2006.01)
*G02F 1/1333* (2006.01)

(56) References Cited

U.S. PATENT DOCUMENTS

| 10,179,445 | B2 | 1/2019 | Kobayashi et al. |
| 2015/0224756 | A1* | 8/2015 | Kobayashi ........ B32B 17/10018 522/64 |
| 2017/0179416 | A1 | 6/2017 | Lim et al. |
| 2020/0002587 | A1 | 1/2020 | Jialanella et al. |

FOREIGN PATENT DOCUMENTS

| JP | 5307714 | 10/2013 |
| JP | 5409994 | 2/2014 |
| JP | 5745708 | 7/2015 |
| JP | 6076395 | 2/2017 |
| JP | 6118366 | 4/2017 |
| JP | 6118367 | 4/2017 |
| JP | 6130156 | 5/2017 |
| JP | 6174624 | 8/2017 |
| JP | 6180460 | 8/2017 |
| JP | 6185122 | 8/2017 |
| JP | 2019-26833 | 2/2019 |
| KR | 10-2017-0075116 | 7/2017 |
| KR | 10-2019-0125337 | 11/2019 |
| WO | 2006/129678 | 12/2006 |

* cited by examiner

RESIN COMPOSITION AND DISPLAY DEVICE INCLUDING ADHESIVE LAYER FORMED FROM THE SAME

CROSS-REFERENCE TO RELATED APPLICATION(S)

This application claims priority to and benefits of Korean Patent Application No. 10-2020-0187705 under 35 U.S.C. § 119, filed on Dec. 30, 2020 in the Korean Intellectual Property Office, the entire contents of which are incorporated herein by reference.

BACKGROUND

1. Technical Field

The disclosure relates to a resin composition and a display device including an adhesive layer formed from the resin composition.

2. Description of the Related Art

Various types of display devices used for multimedia devices are being developed, such as a television set, a mobile phone, a tablet computer, a navigation system, and a game console. Recently, display devices which are foldable, bendable, or rollable using flexible display members are under development to enable ease of portability and increase user friendliness.

Adhesive resins which are used to form an adhesive layer applied to various forms of display devices need to have excellent adhesion to members of the various forms of display devices. The members which are used in flexible display devices are required to secure reliability in the act of folding or bending.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition having excellent adhesion and elastic modulus after curing.

The disclosure also provides a display device including an adhesive layer having excellent adhesion and elastic modulus.

An embodiment provides a resin composition which may include at least one (meth)acrylate monomer, a urethane (meth)acrylate oligomer represented by Formula 1 below, and at least one photo initiator.

[Formula 1]

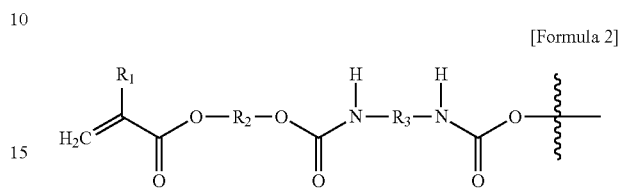

In Formula 1 above, n1 may be an integer from 1 to 25, $X_1$ and $X_2$ may each independently be a polybutadiene, a hydrogenated polybutadiene, a polyisoprene, or a hydrogenated polyisoprene, $R_a$ may be a substituted or unsubstituted alkyl group having 1 to 10 carbon atoms or a substituted or unsubstituted aryl group having 6 to 20 ring-forming carbon atoms, and $A_1$ and $A_2$ may each independently be a group represented by Formula 2 below.

[Formula 2]

In Formula 2 above, $R_1$ may be a hydrogen atom or a substituted or unsubstituted alkyl group having 1 to 6 carbon atoms, $R_2$ may be a substituted or unsubstituted alkoxy group, a substituted or unsubstituted divalent alkyl group having 1 to 10 carbon atoms, a substituted or unsubstituted divalent alkenyl group having 2 to 10 carbon atoms, or a substituted or unsubstituted divalent alkynyl group having 2 to 10 carbon atoms, and $R_3$ may be a substituted or unsubstituted divalent alkyl group having 1 to 15 carbon atoms or a substituted or unsubstituted divalent aryl group having 6 to 20 carbon atoms.

In an embodiment, the urethane (meth)acrylate oligomer may have a number average molecular weight in a range of about 2,500 to about 30,000.

In an embodiment, $X_1$ and $X_2$ may each independently have a number average molecular weight in a range of about 1,000 to about 5,000.

In an embodiment, $X_1$ and $X_2$ may each independently be a group represented by any one of Formulas X-1 to X-3 below.

[Formula X-1]

[Formula X-2]

[Formula X-3]

In Formula X-1 above, p1 and p2 may each independently be an integer from 0 to 87, and the sum of p1 and p2 may be 17 to 88. In Formula X-2 above, m1 and m2 may each independently be an integer from 0 to 90, and the sum of m1 and m2 may be 17 to 90. In Formula X-3 above, z1 and z2 may each independently be an integer from 0 to 71, z3 may be an integer from 0 to 90, and the sum of z1, z2, and z3 may be 14 to 71.

In an embodiment, $X_1$ and $X_2$ may be the same.

In an embodiment, after UV curing, the resin composition may have a storage modulus in a range of about $1.0\times10^4$ Pa to about $1.0\times10^6$ Pa at about $-20°$ C., and the resin composition may have a storage modulus in a range of about $1.0\times10^4$ Pa to about $1.0\times10^6$ Pa at about $60°$ C.

In an embodiment, after UV curing, the resin composition may have a storage modulus at about $-20°$ C. that is about 1 to about 15 times greater than a storage modulus at about $60°$ C.

In an embodiment, an amount of the (meth)acrylate monomer in the resin composition may be in a range of about 65 wt % to about 94 wt %, with respect to a total amount of the resin composition.

In an embodiment, an amount of the urethane (meth) acrylate oligomer in the resin composition may be in a range of about 5 wt % to about 30 wt %, with respect to a total amount of the resin composition.

In an embodiment, an amount of the photo initiator in the resin composition may be in a range of about 0.5 wt % to about 5 wt %, with respect to a total amount of the resin composition.

In an embodiment, the (meth)acrylate monomer may contain at least one of 2-ethylhexyl acrylate and 4-hydroxybutyl acrylate.

In an embodiment, a display device may include a display module including a display panel, a window disposed on the display panel, and an adhesive layer disposed between the display panel and the window. The adhesive layer may include a polymer derived from a resin composition that includes at least one (meth)acrylate monomer, a urethane (meth)acrylate oligomer represented by Formula 1 as defined in this specification, and at least one photo initiator.

In an embodiment, the adhesive layer may have a storage modulus in a range of about $1.0\times10^4$ Pa to about $1.0\times10^6$ Pa at about $-20°$ C., and the adhesive layer may have a storage modulus in a range of about $1.0\times10^4$ Pa to about $1.0\times10^6$ Pa at about $60°$ C.

In an embodiment, the adhesive layer may have a storage modulus at about $-20°$ C. that is about 1 to about 15 times greater than a storage modulus at about $60°$ C.

In an embodiment, the adhesive layer may have a thickness in a range of about 10 μm to about 200 μm.

In an embodiment, the display device may further include an input sensor disposed on the display panel, wherein the adhesive layer may be disposed between the display panel and the input sensor or between the input sensor and the window.

In an embodiment, the display device may include at least one folding area, and the folding area may have a radius of curvature equal to or less than about 5 mm.

In an embodiment, the display device may further include a light control layer disposed between the adhesive layer and the window, and an optical adhesive layer disposed between the light control layer and the window. The optical adhesive layer may include a polymer derived from the resin composition.

In an embodiment, the adhesive layer may be formed by providing the resin composition directly on a surface of the window or directly on a surface of the display module, and UV curing the provided resin composition.

BRIEF DESCRIPTION OF THE DRAWINGS

The accompanying drawings are included to provide a further understanding of the embodiments, and are incorporated in and constitute a part of this specification. The drawings illustrate embodiments of the disclosure and principles thereof. The above and other aspects and features of the disclosure will become more apparent by describing in detail embodiments thereof with reference to the attached drawings, in which.

DETAILED DESCRIPTION OF THE EMBODIMENTS

Figure 1:
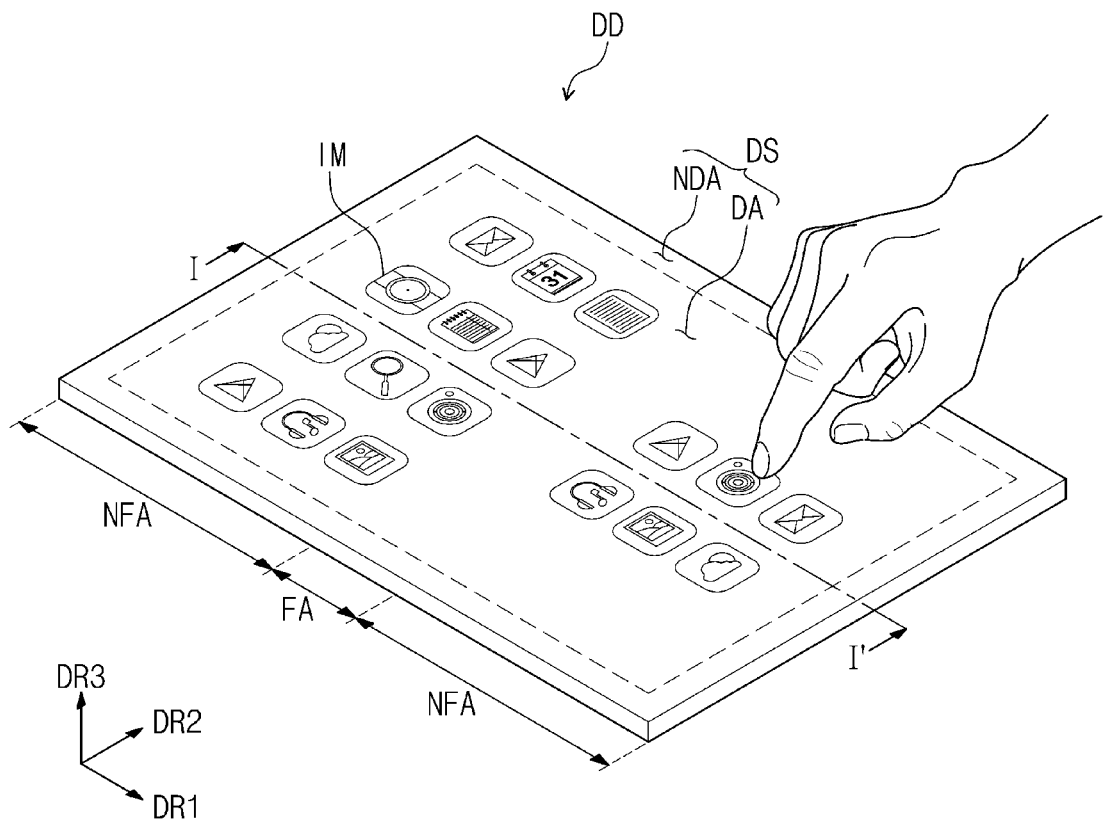
FIG. 1 is a perspective view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like numbers refer to like elements throughout.

In the description, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the description, when an element is "directly on," "directly connected to," or "directly coupled to" another element, there are no intervening elements present. For example, "directly on" may mean that two layers or two elements are disposed without an additional element such as an adhesion element therebetween.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

The term "at least one of" is intended to include the meaning of "at least one selected from" for the purpose of its meaning and interpretation. For example, "at least one of A and B" may be understood to mean "A, B, or A and B." When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within ±20%, 10%, or 5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a resin composition according to an embodiment and a display device according to an embodiment will be described with reference to the accompanying drawings.

Figure 2:
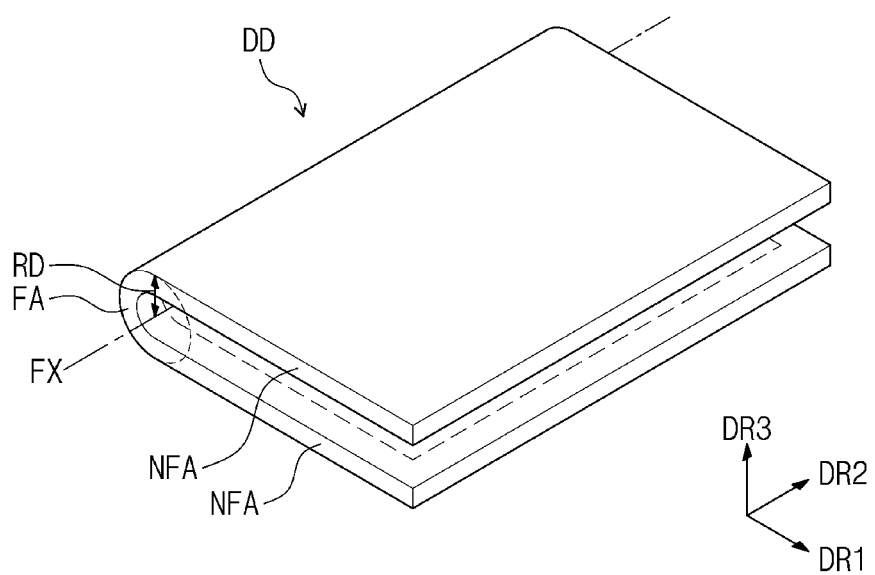
FIG. 2 is a perspective view illustrating the display device shown in FIG. 1 in a folded state.

FIG. 1 is a perspective view of a display device according to an embodiment. FIG. 2 is a perspective view illustrating the display device shown in FIG. 1 in a folded state.

Referring to FIG. 1, a display device DD of an embodiment may have a rectangular shape which has long sides extending in a first directional axis DR1 and short sides extending in a second directional axis DR2 crossing the first directional axis DR1. However, embodiments are not limited thereto, and the display device DD may have various shapes such as circular and polygonal shapes. The display device DD may be a foldable display device.

In the display device DD according to an embodiment, a display surface DS on which an image IM is displayed may be parallel to a plane defined by the first directional axis DR1 and the second directional axis DR2. A normal direction of the display surface DS, for example, a thickness direction of the display device DD may be indicated by a third directional axis DR3. A front surface (or an upper surface) and a rear surface (or a lower surface) of respective members are defined by the third directional axis DR3. However, the directions indicated by the first to third directional axes DR1, DR2, and DR3 are relative concepts, and may thus be changed to other directions. Hereinafter, first to third directions correspond to directions indicated by the first to third directional axes DR1, DR2, and DR3, respectively, and are given the same reference numerals.

The display device DD of an embodiment may include at least one folding area FA. Referring to FIGS. 1 and 2, the display device DD may include the folding area FA and non-folding areas NFA. The folding area FA may be disposed between the non-folding areas NFA, and the folding area FA and the non-folding areas NFA may be arranged adjacent to each other along the first directional axis DR1.

The folding area FA may be a portion deformable into a shape which is folded with respect to a folding axis FX parallel to the second directional axis DR2. The folding area FA may have a radius of curvature RD equal to or less than about 5 mm.

FIGS. 1 and 2, as an example, illustrate one folding area FA and two non-folding areas NFA, but the numbers of the folding area FA and the non-folding areas NFA are not limited thereto. For example, the display device DD may include three or more non-folding areas NFA and multiple folding areas FA disposed between the non-folding areas NFA.

A display surface DS of the display device DD may include a display area DA and a non-display area NDA around the display area DA. The display area DA may display images, and the non-display area NDA may not display images. The non-display area NDA may surround the display area DA, and may define an edge of the display device DD.

Referring to FIG. 2, the display device DD may be a foldable display device DD which may be folded or unfolded. For example, the folding area FA may be folded along the folding axis FX, which is parallel to the second directional axis DR2, so that the display device DD may be folded. The folding axis FX may be defined as a minor axis parallel to the short sides of the display device DD. However, embodiments are not limited thereto, and the folding axis may be a major axis parallel to the long sides of the display device DD. Although not shown in FIG. 2, the folding axis may be parallel to the first directional axis DR1.

When the display device DD is folded, the non-folding areas NFA may face each other, and the display device DD may be in-folded such that the display surface DS may not exposed to the outside. However, embodiments are not limited thereto, and the display device DD may be out-folded such that the display surface DS may be exposed to the outside.

Figure 3:
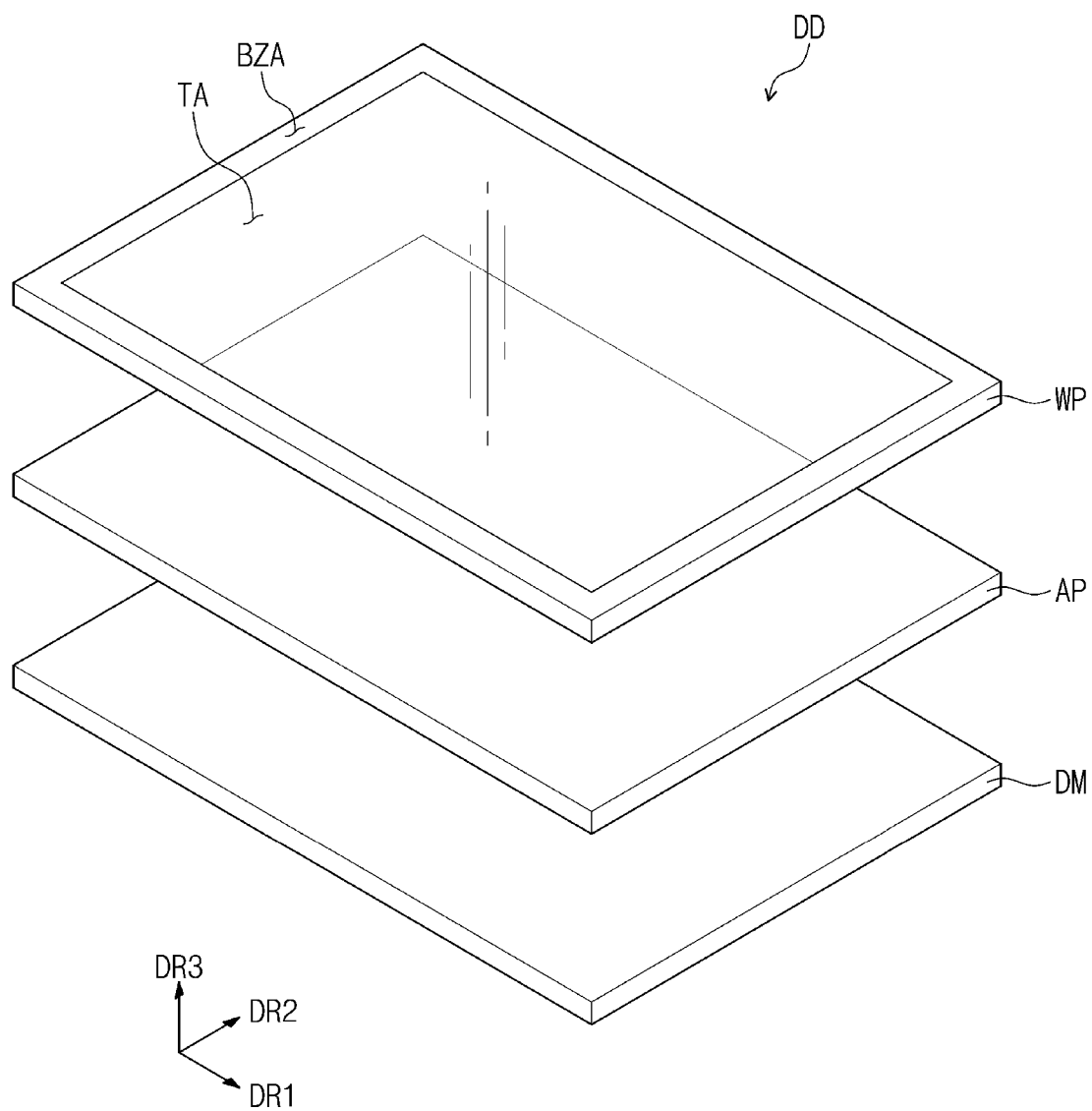
FIG. 3 is an exploded perspective view of a display device according to an embodiment.
Figure 4:
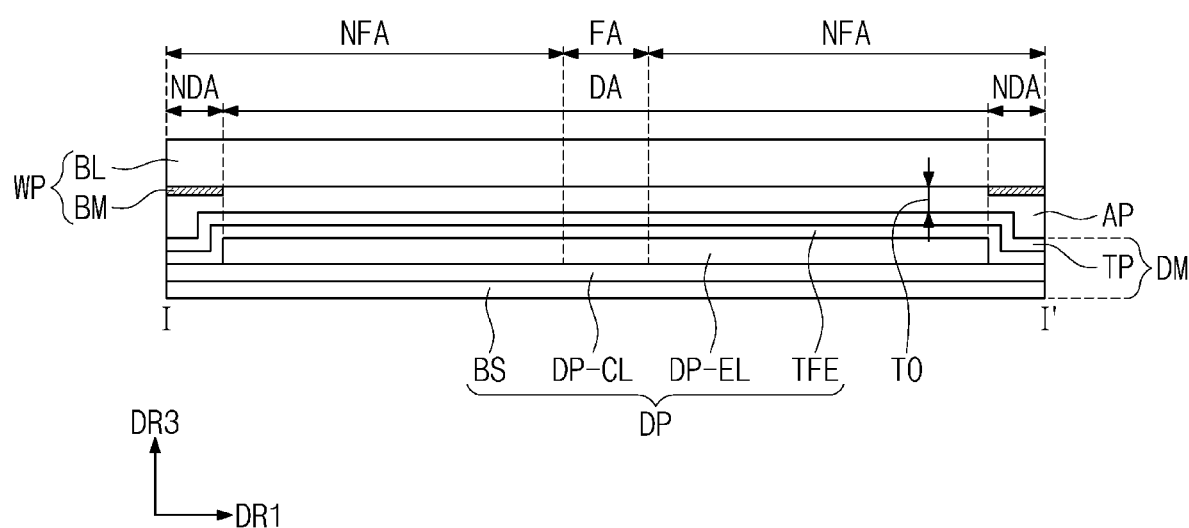
FIG. 4 is a schematic cross-sectional view of a display device according to an embodiment, corresponding to line I-I' of FIG. 1.

FIG. 3 is an exploded perspective view of a display device DD according to an embodiment. FIG. 4 is a view corresponding to line I-F of FIG. 1, and a schematic cross-sectional view of a display device DD according to an embodiment.

The display device DD of an embodiment may include a display module DM, and a window WP disposed on the display module DM. In the display device DD of an embodiment, the display module DM includes a display panel DP having a display element layer DP-EL, and an input sensor TP disposed on the display panel DP. The display device DD of an embodiment may include an adhesive layer AP disposed between the display panel DP and the window WP. For example, the adhesive layer AP may be disposed between the input sensor TP and the window WP. The adhesive layer AP may be disposed on the input sensor TP. In another embodiment, the adhesive layer AP may be disposed between the display panel DP and the input sensor TP. The adhesive layer AP may be an optically clear adhesive resin layer (OCR).

The adhesive layer AP may include a polymer derived from a resin composition of an embodiment. The resin composition of an embodiment may include at least one (meth)acrylate monomer, at least one photo initiator, and a urethane (meth)acrylate oligomer represented by Formula 1 below. The urethane (meth)acrylate oligomer may include a polybutadiene structure in which a phosphate ester group is bonded, or a polyisoprene structure in which a phosphate ester group is bonded.

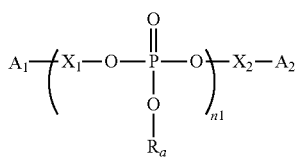

[Formula 1]

In Formula 1, n1 may be an integer from 1 to 25. $X_1$ and $X_2$ may each independently be a polybutadiene, a hydrogenated polybutadiene, a polyisoprene, or a hydrogenated polyisoprene. In the description, the hydrogenated polybutadiene may be a material in which at least one double bond among the double bonds included in polybutadiene turns into a single bond. In the description, the hydrogenated polyisoprene may be a material in which at least one double bond among the double bonds included in polyisoprene turns into a single bond. The hydrogenated polybutadiene may be produced by a hydrogenation reaction of polybutadiene. The hydrogenated polyisoprene may be produced by a hydrogenation reaction of polyisoprene. The polybutadiene and the polyisoprene may each contain both cis-isomers and trans-isomers.

In an embodiment, $X_1$ and $X_2$ may be the same. In another embodiment, $X_1$ and $X_2$ may be different. In an embodiment, $X_1$ and $X_2$ may each independently have a number average molecular weight in a range of about 1,000 to about 5,000. For example, $X_1$ and $X_2$ may each independently have a number average molecular weight in a range of about 1,000 to about 3,000. A display device DD including an adhesive layer AP formed from a resin composition where $X_1$ and $X_2$ have a number average molecular weight in a range of about 1,000 to about 5,000 may maintain reliability when repeatedly folded and unfolded.

A display device including an adhesive layer formed from a resin composition where a urethane (meth)acrylate oligomer contains a polyisoprene, a hydrogenated polyisoprene, a polybutadiene, or a hydrogenated polybutadiene having a number average molecular weight of less than about 1,000 may have lifting or delamination of the adhesive layer when repeatedly folded and unfolded. A resin composition where a urethane (meth)acrylate oligomer contains a polyisoprene, a hydrogenated polyisoprene, a polybutadiene, or a hydrogenated polybutadiene having a number average molecular weight of greater than about 5,000 may have reduced compatibility.

In an embodiment, $X_1$ and $X_2$ may each independently be a group represented by any one of Formulas X-1 to X-3 below. Formula X-1 contains two hydrogenated polybutadienes, and the two hydrogenated polybutadienes are a hydrogenated linear polybutadiene and a hydrogenated branched polybutadiene. Formula X-2 contains two non-hydrogenated polybutadienes, and the two non-hydrogenated polybutadienes are a linear polybutadiene and a branched polybutadiene. Formula X-3 contains three polyisoprenes, and the three polyisoprenes are not hydrogenated.

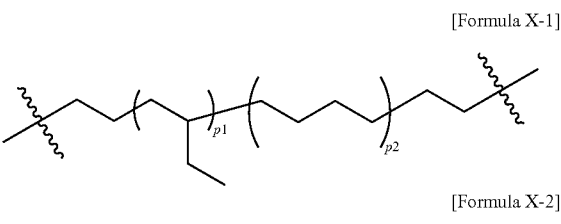

[Formula X-1]

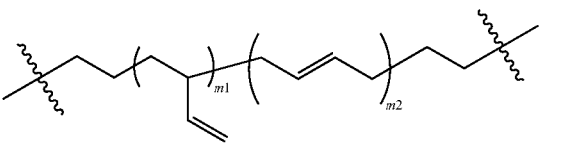

[Formula X-2]

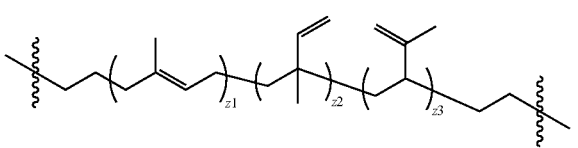

[Formula X-3]

In Formula X-1, p1 and p2 may each independently be an integer from 0 to 87, and the sum of p1 and p2 may be 17 to 88. At least one of p1 or p2 may be an integer of 1 or greater. In Formula X-2, m1 and m2 may each independently be an integer from 0 to 90, and the sum of m1 and m2 may be 17 to 90. At least one of m1 or m2 may be an integer of 1 or greater. In Formula X-3, z1 and z2 may each independently be an integer from 0 to 71, z3 may be an integer from 0 to 90, and the sum of z1, z2, and z3 may be about 14 to about 71. At least one of z1 to z3 may be an integer of 1 or greater.

Polymers represented by any one of Formulas X-1 to X-3 each may have a number average molecular weight in a range of about 1,000 to about 5,000. For example, a hydrogenated polybutadiene represented by Formula X-1 may have a number average molecular weight in a range of about 1,500 or about 3,100. A polybutadiene represented by Formula X-2 may have a number average molecular weight in a range of about 1,400 or about 3,000. A polyisoprene represented by Formula X-3 may have a number average molecular weight of about 2,500. However, these are presented as examples, and embodiments are not limited thereto.

In Formula 1, $R_a$ may be a substituted or unsubstituted alkyl group having 1 to 10 carbon atoms or a substituted or unsubstituted aryl group having 6 to 20 ring-forming carbon atoms. For example, $R_a$ may be a methyl group or a phenyl group.

In Formula 1, $A_1$ and $A_2$ may each independently be a group represented by Formula 2 below.

[Formula 2]

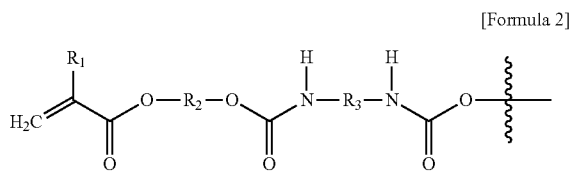

In Formula 2, $R_1$ may be a hydrogen atom or a substituted or unsubstituted alkyl group having 1 to 6 carbon atoms. $R_2$ may be a substituted or unsubstituted alkoxy group, a substituted or unsubstituted divalent alkyl group having 1 to 10 carbon atoms, a substituted or unsubstituted divalent alkenyl group having 2 to 10 carbon atoms, or a substituted or unsubstituted divalent alkynyl group having 2 to 10 carbon atoms. For example, $R_2$ may be a divalent alkyl group containing an ether bond.

In Formula 2, $R_3$ may be a substituted or unsubstituted divalent alkyl group having 1 to 15 carbon atoms or a substituted or unsubstituted divalent aryl group having 6 to 20 carbon atoms. For example, $R_3$ may be a diisocyanate group used in the synthesis of urethane (meth)acrylate, from which two isocyanate groups are removed. $R_3$ may be one in which the alkyl group or the aryl group is bonded to nitrogen atoms included in the urethane bond after the two isocyanate groups bonded to the alkyl group or the aryl group are removed.

In the description, the term "substituted or unsubstituted" may mean a group that is substituted or unsubstituted with at least one substituent selected from the group consisting of a deuterium atom, a halogen atom, a cyano group, a nitro group, an amine group, a silyl group, an oxy group, a thio group, a sulfinyl group, a sulfonyl group, carbonyl group, a boron group, an alkyl group, an alkenyl group, an alkynyl group, an alkoxy group, a hydrocarbon ring group, an aryl group, and a heterocyclic group. Each of the substituents listed above may themselves be substituted or unsubstituted. For example, a biphenyl group may be interpreted as an aryl group or as a phenyl group substituted with a phenyl group.

In the description, an alkyl group may be a linear, a branched, or a cyclic type. The number of carbon atoms in the alkyl group may be 1 to 50, 1 to 30, 1 to 20, 1 to 10, or 1 to 6. Examples of the alkyl group may include a methyl group, an ethyl group, an n-propyl group, an isopropyl group, an n-butyl group, a s-butyl group, a t-butyl group, an i-butyl group, a 2-ethylbutyl group, a 3,3-a dimethylbutyl group, an n-pentyl group, an i-pentyl group, a neopentyl group, a t-pentyl group, a cyclopentyl group, a 1-methylpentyl group, a 3-methylpentyl group, a 2-ethylpentyl group, a 4-methyl-2-pentyl group, an n-hexyl group, a 1-methylhexyl group, a 2-ethylhexyl group, a 2-butylhexyl group, a cyclohexyl group, a 4-methylcyclohexyl group, a 4-t-butylcyclohexyl group, an n-heptyl group, a 1-methylheptyl group, a 2,2-dimethylheptyl group, a 2-ethylheptyl group, a 2-butylheptyl group, an n-octyl group, a t-octyl group, a 2-ethyloctyl group, a 2-butyloctyl group, a 2-hexyloctyl group, a 3,7-dimethyloctyl group, a cyclooctyl group, an n-nonyl group, an n-decyl group, an adamantyl group, a 2-ethyldecyl group, a 2-butyldecyl group, a 2-hexyldecyl group, a 2-octyldecyl group, an n-undecyl group, an n-dodecyl group, a 2-ethyldodecyl group, a 2-butyldodecyl group, a 2-hexyldocecyl group, a 2-octyldodecyl group, an n-tridecyl group, an n-tetradecyl group, an n-pentadecyl group, an n-hexadecyl group, a 2-ethylhexadecyl group, etc., but are not limited thereto.

In the description, an alkenyl group may be linear or branched. The alkenyl group may include at least one double bond. The number of carbon atoms is not particularly limited, but may be 2 to 30, 2 to 20, or 2 to 10. Examples of the alkenyl group may include a vinyl group, a 1-butenyl group, a 1-pentenyl group, a 1,3-butadienyl aryl group, a styrenyl group, a styryl vinyl group, etc., but are not limited thereto.

In the description, an alkynyl group may be linear or branched. The alkynyl group may include at least one triple bond. The number of carbon atoms is not particularly limited, but may be 2 to 30, 2 to 20, or 2 to 10. Examples of the alkynyl group may include an ethynyl group, a propynyl group, a 1-butynyl group, etc., but are not limited thereto.

In the description, the above description of the alkyl group may be applied to a divalent alkyl group, except that the divalent alkyl group is a divalent group. The above description of the alkenyl group may be applied to a divalent alkenyl group, except that the divalent alkenyl group is a divalent group. The above description of the alkynyl group may be applied to a divalent alkynyl group, except that the divalent alkynyl group is a divalent group.

In the description, an aryl group may be any functional group or substituent derived from an aromatic hydrocarbon ring. The aryl group may be a monocyclic aryl group or a polycyclic aryl group. The number of ring-forming carbon atoms in the aryl group may be 6 to 30, 6 to 20, or 6 to 15. Examples of the aryl group may include a phenyl group, a naphthyl group, a fluorenyl group, an anthracenyl group, a phenanthryl group, a biphenyl group, a terphenyl group, a quaterphenyl group, a quinquephenyl group, a sexiphenyl group, a triphenylenyl group, a pyrenyl group, a benzofluoranthenyl group, a chrysenyl group, etc., but are not limited thereto.

In the description, an alkoxy group may be a linear, a branched, or a cyclic type. The number of carbon atoms in the alkoxy group may be 1 to 20 or 1 to 10. Examples of the alkoxy group may include methoxy, ethoxy, propoxy, butoxy, etc., but are not limited thereto.

In the description,

represents a binding site to a neighboring atom.

In the resin composition of an embodiment, the urethane (meth)acrylate oligomer may have a number average molecular weight in a range of about 2,500 to about 30,000. For example, the urethane (meth)acrylate oligomer may have a number average molecular weight in a range of about 2,500 to about 10,000.

In an embodiment, an amount of the urethane (meth)acrylate oligomer in the resin composition may be in a range of about 5 wt % to about 30 wt %, with respect to a total amount of the resin composition. In an embodiment, an amount of the (meth)acrylate monomer in the resin composition may be in a range of about 65 wt % to about 94 wt %, with respect to a total amount of the resin composition. In an embodiment, an amount of the photo initiator in the resin composition may be in a range of about 0.5 wt % to about 5 wt %, with respect to a total amount of the resin composition. For example, the amount of the urethane (meth) acrylate oligomer in the resin composition may be in a range of about 7 wt % to about 12 wt %, with respect to a total amount of the resin composition. For example, the amount of the (meth)acrylate monomer in the resin composition may be in a range of about 87 wt % to about 92 wt %, with respect to a total amount of the resin composition. For example, the amount of the photo initiator in the resin composition may be in a range of about 1 wt % to about 3 wt %, with respect to a total amount of the resin composition. However, these are presented as examples, and a content of the urethane (meth)acrylate oligomer, a content of the (meth)acrylate monomer, and a content of the photo initiator are not limited thereto.

The (meth)acrylate monomer may include at least one acryloyl group or at least one methacryloyl group per monomer unit. In the description, the (meth)acryloyl group may be an acryloyl group or a methacryloyl group, and the (meth)acrylic may be an acrylic group or a methacrylic group. For example, the (meth)acrylate monomer may be an acrylate monomer or a methacrylate monomer containing at least one acryloyl group or at least one methacryloyl group.

According to an embodiment, the (meth)acrylate monomer may contain at least one of 2-ethylhexyl acrylate and 4-hydroxybutyl acrylate. The (meth)acrylate monomer may contain any one among n-butyl (meth)acrylate, n-hexyl (meth)acrylate, n-octyl (meth)acrylate, isodecyl(meth)acrylate, ethoxy diethyleneglycol acrylate, and 2-ethylhexyl-diglycol acrylate.

The (meth)acrylate monomer may contain at least one of alicyclic (meth)acrylate and alkyl (meth)acrylate. For example, examples of the alkyl (meth)acrylate may include methyl (meth)acrylate, lauryl (meth)acrylate, stearyl (meth)acrylate, isostearyl (meth)acrylate, etc. Examples of the alicyclic (meth)acrylate may include dicyclopentenyloxyethyl (meth)acrylate, norbornene (meth)acrylate, dicyclopentenyl (meth)acrylate, isobornyl (meth)acrylate, 2-methyl-2-ethyl-1,3-dioxolan-4-yl)-methyl acrylate, etc.

The (meth)acrylate monomer may include a nitrogen-containing (meth)acrylate. Examples of the nitrogen-containing (meth)acrylate may include (meth)acrylamide, N-methyl(meth)acrylamide, N-ethyl(meth)acrylamide, N-propyl(meth)acrylamide, N-isopropyl(meth)acrylamide, N-butyl(meth)acrylamide, N-isobutyl(meth)acrylamide, N-tert-butyl(meth)acrylamide, N-methoxymethyl(meth)acrylamide, N-ethoxymethyl(meth)acrylamide, N-butoxymethyl(meth)acrylamide, N-isobutoxymethyl(meth)acrylamide, N-tert-butoxymethyl(meth)acrylamide, N,N-dimethyl (meth)acrylamide, N,N-diethyl(meth)acrylamide, N-(meth)acryloyl morpholine, N-vinyl-2-pyrrolidinone, N-(meth)acryloyl pyrrolidinone, N-(meth)acryloyl piperidine, N-(meth)acryloylpyrrolidine, N-(meth)acryloyl aziridine, aziridinylethyl (meth)acrylate, 2-vinylpyridine, 4-vinylpyridine, 2-vinylpyrazine, 1-vinylimidazole, N-vinylcarbazole, N-vinylphthalimide, etc.

The resin composition of an embodiment may include at least one photo initiator. When the resin composition includes multiple photo initiators, different photo initiators may each be activated by UV radiation having different central wavelengths.

For example, the photo initiator may be any one among 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

The photo initiator may be any one among 2-methyl-1[4-(methylthio)phenyl]-2-morpholinopropan-1-one, 2-benzyl-2-dimethylamino-1-(4-morpholinophenyl)-butanone-1,2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino] benzoate, [1-[9-ethyl-6-(2-methylbenzoyl)carbazol-3-yl] ethylideneamino] acetate), and bis(2,4-cyclopentadienyl)bis [2,6-difluoro-3-(1-pyrryl)phenyl] titanium(IV).

A liquid resin composition may be cured through UV irradiation, and after UV curing, the liquid resin composition may have a storage modulus value in a range of about $1.0 \times 10^4$ Pa to about $1.0 \times 10^6$ Pa at about $-20°$ C. After UV curing, the resin composition may have a storage modulus value in a range of about $1.0 \times 10^4$ Pa to about $1.0 \times 10^6$ Pa at about $60°$ C. After UV curing, the resin composition may have a storage modulus at about $-20°$ C. that is about 1 to about 15 times greater than a storage modulus at about $60°$ C.

The resin composition of an embodiment may include a urethane (meth)acrylate oligomer, at least one (meth)acrylate monomer, and at least one photo initiator. The urethane (meth)acrylate oligomer may include a phosphate ester group, and the phosphate ester group may be bonded to a polyisoprene, a hydrogenated polyisoprene, a polybutadiene, or a hydrogenated polybutadiene. Accordingly, an adhesive layer including a polymer derived from the resin composition of an embodiment may exhibit satisfactory compatibility.

Referring to FIG. 4, the display panel DP may include a base substrate BS, a circuit layer DP-CL disposed on the base substrate BS, and a display element layer DP-EL disposed on the circuit layer DP-CL, and an encapsulation layer TFE covering the display element layer DP-EL. For example, the display panel DP may include multiple organic light emitting elements or multiple quantum dot light emitting elements in the display element layer DP-EL. The display panel DP may include a liquid crystal display element, and when the display panel DP includes the liquid crystal display element, the encapsulation layer TFE may be omitted.

An input sensor TP may be disposed on the display panel DP. For example, the input sensor TP may be directly disposed on the encapsulation layer TFE of the display panel DP. The input sensor TP may detect external inputs to convert the inputs into input signals, and provide the input signals to the display panel DP. The display panel DP may receive the input signals from the input sensor TP and generate images corresponding to the input signals. For example, in the display device DD of an embodiment, the input sensor TP may be a touch sensing unit detecting a touch. The input sensor TP may recognize a user's direct touch, a user's indirect touch, a direct touch of an object, or an indirect touch of an object.

The window WP may protect the display panel DP and the input sensor TP. An image IM generated from the display panel DP may be provided to users by being transmitted through the window WP. The window WP may provide a touch surface of the display device DD. In the display device DD including a folding area FA, the window WP may be a flexible window.

The window WP may include a transmission area TA and a bezel area BZA. A front surface of the window WP including the transmission area TA and the bezel area BZA corresponds to a front surface of the display device DD. The transmission area TA may be an optically transparent area. The bezel area BZA may be an area having a relatively lower light transmittance than the transmission area TA. The bezel area BZA may have a color. The bezel area BZA may be adjacent to the transmission area TA and may surround the transmission area TA. The bezel area BZA may define the shape of the transmission area TA. However, embodiments are not limited to the one illustrated, the bezel area BZA may be disposed adjacent to only one side of the transmission area TA, and a portion thereof may be omitted.

The window WP may include a base layer BL and a printing layer BM. The base layer BL may be a glass or plastic substrate. For example, in an embodiment, the base layer BL may be a tempered glass substrate. In another embodiment, the base layer BL may be formed of a flexible polymer resin. For example, the base layer BL may be formed of polyimide, polyacrylate, polymethylmethacrylate, polycarbonate, polyethylenenaphthalate, polyvinylidene chloride, polyvinylidene difluoride, polystyrene, ethylene vinyl alcohol copolymer, or combinations thereof. However, embodiments are not limited thereto, and any general form of the base layer BL of the window WP in the art may be used without limitation.

The printing layer BM may be disposed on a surface of the base layer BL. In an embodiment, the printing layer BM may be provided on a lower surface of the base layer BL adjacent to the display module DM. The printing layer BM may be disposed on an edge area of the base layer BL. The printing layer BM may be an ink printing layer. For example, the printing layer BM may be a layer formed by including a pigment or dye. In the window WP, the bezel area BZA may be a portion in which the printing layer BM is provided.

The window WP may further include at least one functional layer (not shown) provided on the base layer BL. For example, the functional layer (not shown) may be a hard coating layer, an anti-fingerprint coating layer, etc., but embodiments are not limited thereto.

According to an embodiment, the adhesive layer AP may be disposed between the input sensor TP and the window WP. The adhesive layer AP may have a thickness TO in a range of about 10 μm to about 200 μm. When an adhesive layer has a thickness of less than 10 μm, the adhesive layer may have reduced adhesion to members such as windows and display panels. When an adhesive layer has a thickness of greater than 200 μm, the adhesive layer may not allow for easy folding and unfolding.

An adhesive layer AP containing a polymer derived from the resin composition of an embodiment may have a storage modulus at about −20° C. that is about 1 to about 15 times greater than a storage modulus at about 60° C. The adhesive layer AP of an embodiment may have a storage modulus in a range of about $1.0 \times 10^4$ Pa to about $1.0 \times 10^6$ Pa at about −20° C., and the adhesive layer AP may have a storage modulus in a range of about $1.0 \times 10^4$ Pa to about $1.0 \times 10^6$ Pa at about 60° C. Accordingly, when the display device DD is repeatedly folded and unfolded, the adhesive layer AP may avoid delamination, and the display device DD may thus maintain reliability thereof.

According to an embodiment, the adhesive layer AP may be formed by UV curing a liquid resin composition. The adhesive layer AP may be formed by providing a resin composition directly on a surface of the window WP or directly on a surface of the display module DM, and UV curing the provided resin composition. In another embodiment, the adhesive layer AP may be provided by UV curing the liquid resin composition in a separate process, laminating a surface of the adhesive layer AP in a cured state in the form of an adhesive film on a surface of the window WP or on a surface of the display module DM, and attaching a surface of the window WP or a surface of the display module DM, which is unattached, to the other surface of the adhesive layer AP.

Figure 5A:
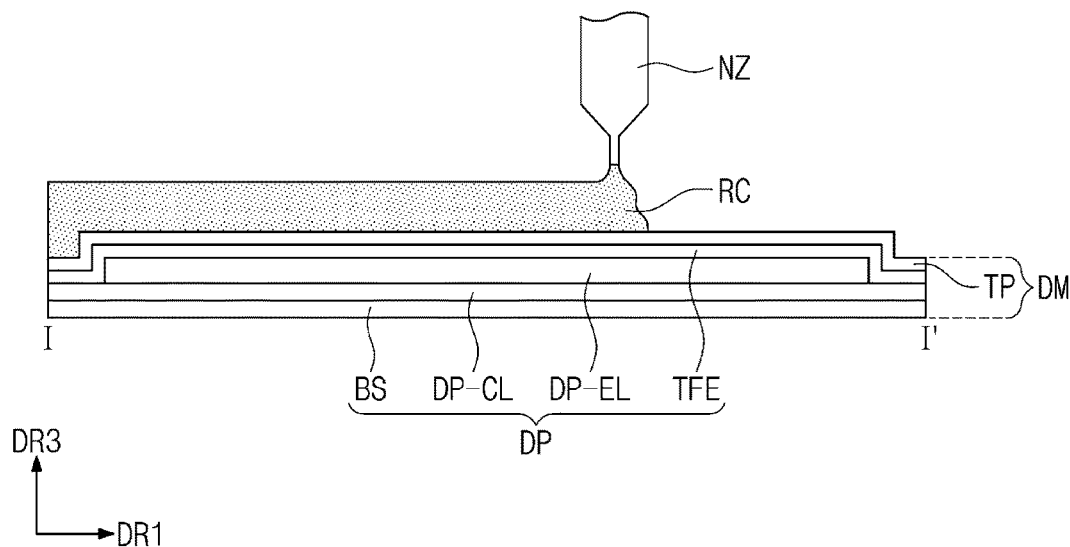
FIG. 5A is a schematic cross-sectional view illustrating a method for manufacturing a display device according to an embodiment.
Figure 5B:
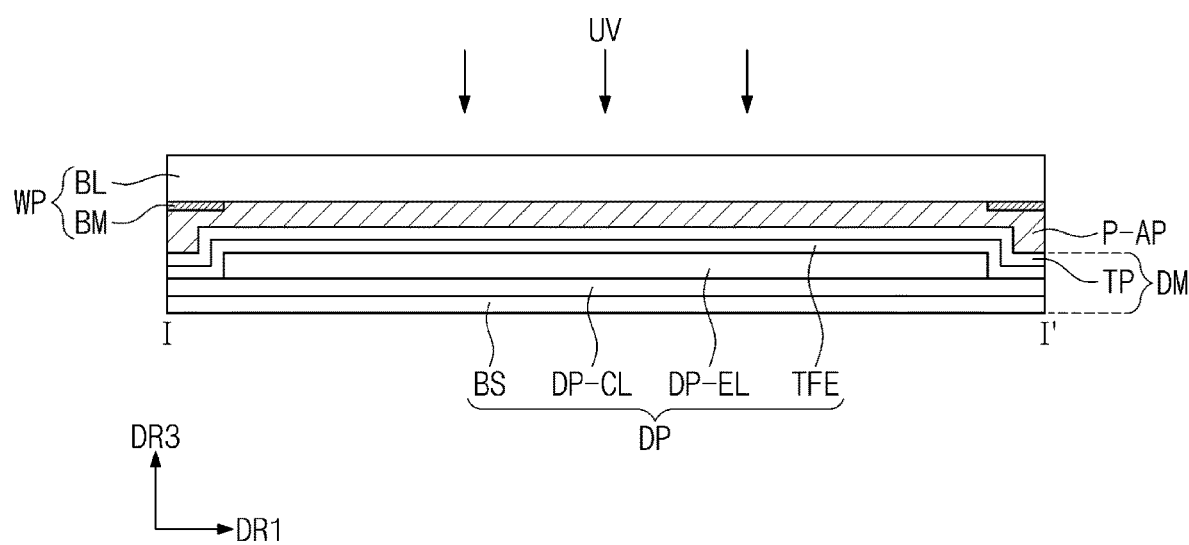
FIG. 5B is a schematic cross-sectional view illustrating a method for manufacturing a display device according to an embodiment.

FIGS. 5A and 5B are each a schematic cross-sectional view of a method for manufacturing a display device according to an embodiment by illustrating the formation of an adhesive layer AP from a resin composition RC. FIG. 5A illustrates providing a resin composition RC on a display module DM. FIG. 5A illustrates UV irradiating a pre-adhesive layer P-AP formed from a resin composition RC.

The resin composition RC may be provided by methods such as an inkjet printing method or a dispensing method. The resin composition RC may be provided using a device such as a nozzle NZ. A window WP may be provided on the pre-adhesive layer P-AP formed by applying the resin composition RC to a constant thickness. The UV radiation for curing the resin composition RC may be provided through the window WP.

The pre-adhesive layer P-AP may be cured after polymerization by the provided UV to form an adhesive layer AP. The adhesive layer AP (FIG. 4) provided on the display device DD (FIG. 4) may have a storage modulus in a range of about $1.0 \times 10^4$ Pa to about $1.0 \times 10^6$ Pa at about −20° C. and may have a storage modulus in a range of about $1.0 \times 10^4$ Pa to about $1.0 \times 10^6$ Pa at about 60° C.

Although not shown in FIG. 5B, before the window WP is provided on the pre-adhesive layer P-AP, UV radiation may be provided to the pre-adhesive layer P-AP to perform a polymerization reaction in the resin composition RC. The amount of UV irradiation may be an amount of light that serves to fully cure the resin composition RC. In another embodiment, the adhesive layer AP may be formed by partially performing the polymerization reaction of the resin composition RC in the pre-adhesive layer P-AP state, and further reacting an unreacted resin composition RC after providing the window WP.

Figure 6:
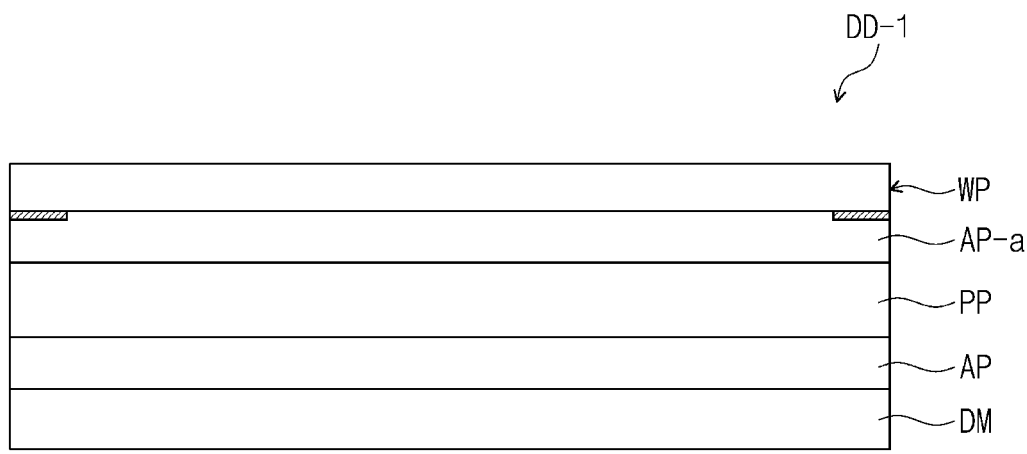
FIG. 6 is a schematic cross-sectional view of a display device according to an embodiment.
Figure 7:
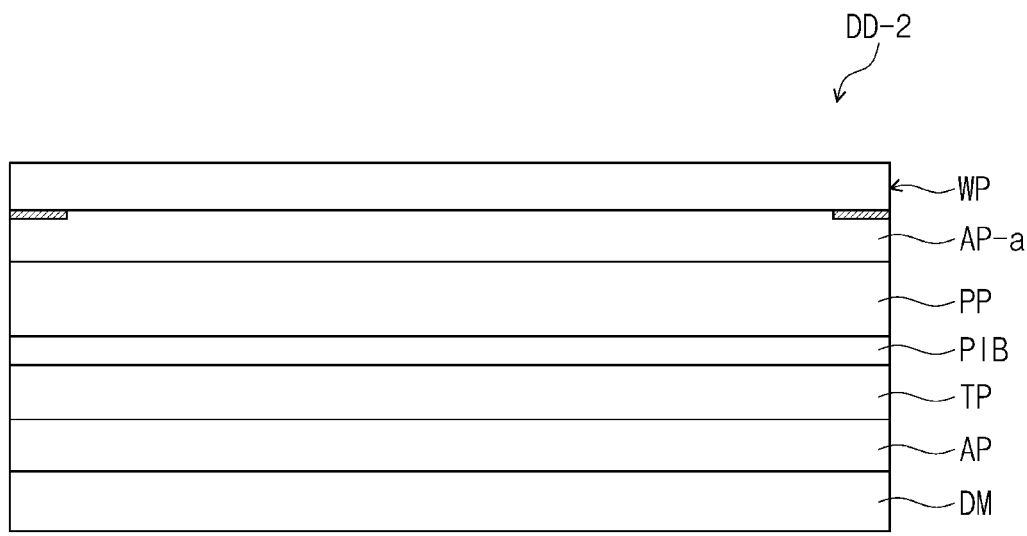
FIG. 7 is a schematic cross-sectional view of a display device according to an embodiment.

FIGS. 6 and 7 are each a schematic cross-sectional view illustrating a display device according to an embodiment. Hereinafter, in the description of FIGS. 6 and 7, content which overlaps that which has been described with reference to FIGS. 1 to 5B will not be described again, and differences will be described.

In contrast to the display device DD shown in FIG. 4, a display device DD-1 of FIG. 6 further includes a light control layer PP and an optical adhesive layer AP-a. The light control layer PP may be disposed between the adhesive layer AP and the window WP, and the optical adhesive layer AP-a may be disposed between the light control layer PP and the window WP. For example, the adhesive layer AP, the light control layer PP, the optical adhesive layer AP-a, and the window WP may be sequentially stacked.

The light control layer PP may be disposed on the display panel DP to control light reflected at the display panel DP due to an external light. The light control layer PP may include a polarizing layer or a color filter layer.

The optical adhesive layer AP-a may include a polymer derived from the resin composition of an embodiment that is included in the adhesive layer AP. The optical adhesive layer AP-a may include a polymer derived from a resin composition including a urethane (meth)acrylate oligomer, a (meth)acrylate monomer, and at least one photo initiator.

The optical adhesive layer AP-a may have a storage modulus in a range of about $1.0 \times 10^4$ Pa to about $1.0 \times 10^6$ Pa at about −20° C., and may have a storage modulus in a range of about $1.0 \times 10^4$ Pa to about $1.0 \times 10^6$ Pa at about 60° C. The optical adhesive layer AP-a may maintain reliability when the display device DD-1 is repeatedly folded and unfolded.

The optical adhesive layer AP-a formed from the resin composition of an embodiment may exhibit satisfactory adhesion to members such as the window WP.

Referring to FIG. 7, a display device DD-2 may further include an interlayer adhesive layer PIB disposed between the input sensor TP and the light control layer PP. The interlayer adhesive layer PIB may be formed of an adhesive material having excellent moisture permeation prevention properties. In the display device DD-2, the adhesive layer AP may be disposed between the display module DM including the display panel DP (FIG. 4) and the input sensor TP, and the optical adhesive layer AP-a may be disposed between the light control layer PP and the window WP. The description of the light control layer PP and the optical adhesive layer AP-a may be the same as those described with reference to FIG. 6.

Hereinafter, with reference to Examples and Comparative Examples, a resin composition according to an embodiment and a display device including an adhesive layer formed from the resin composition of an embodiment will be described. The Examples shown below are described only for the understanding of the disclosure and the scope thereof is not limited thereto.

EXAMPLES

1. Synthesis of Urethane (Meth)Acrylate Oligomer

A method of synthesizing a urethane (meth)acrylate oligomer according to an embodiment will be described by presenting an example method of synthesizing O-1 to O-10. The method of synthesizing the urethane (meth)acrylate oligomers O-1 to O-10 which will be described below is an example, and the method of synthesizing the urethane (meth)acrylate oligomer according to an embodiment is not limited to examples below.

OM-1 synthesized using a synthesis method described below is a urethane (meth)acrylate oligomer without containing a phosphate ester group.

(1) Synthesis of O-1

The urethane (meth)acrylate oligomer O-1 according to an embodiment may be synthesized by, for example, Reaction Formulas 1 and 2 below.

<Synthesis of Phosphate-Modified Diol>

The intermediate phosphate-modified diol may be synthesized by Reaction Formula 1 below.

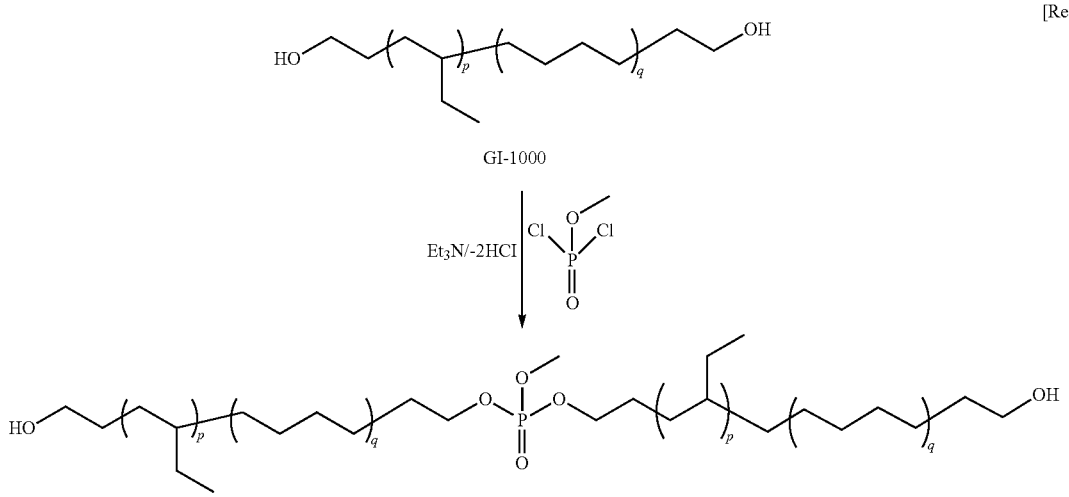

[Reaction Formula 1]

In a separable flask equipped with a cooling tube, a three-one motor, and a dry air introducing tube, 430 g of hydrogenated polybutadiene GI-1000 (alcohol-terminated hydrogenated polybutadiene having a number average molecular weight of about 1500, Nippon Soda) containing a hydroxyl group at an end thereof, 500 g of triethylamine, 400 ml of toluene were added, and the mixture was heated with stirring at 80° C. 20 g of dichloro methylphosphate (Tokyo Chemical Industry Co., Ltd.) was added dropwise thereto, and subjected to reaction at 80° C. for 4 hours. The precipitated salt was removed through filtration and liquid separation to obtain 375 g of polybutadiene oligomer containing methyl phosphate ester, which is phosphate-modified diol, and having hydroxy groups bonded to both ends thereof. The obtained phosphate-modified diol had a number average molecular weight of about 3,100.

<Synthesis of Urethane (Meth)Acrylate Oligomer>

The urethane (meth)acrylate oligomer O-1 according to an embodiment may be synthesized by, for example, Reaction Formula 2 below.

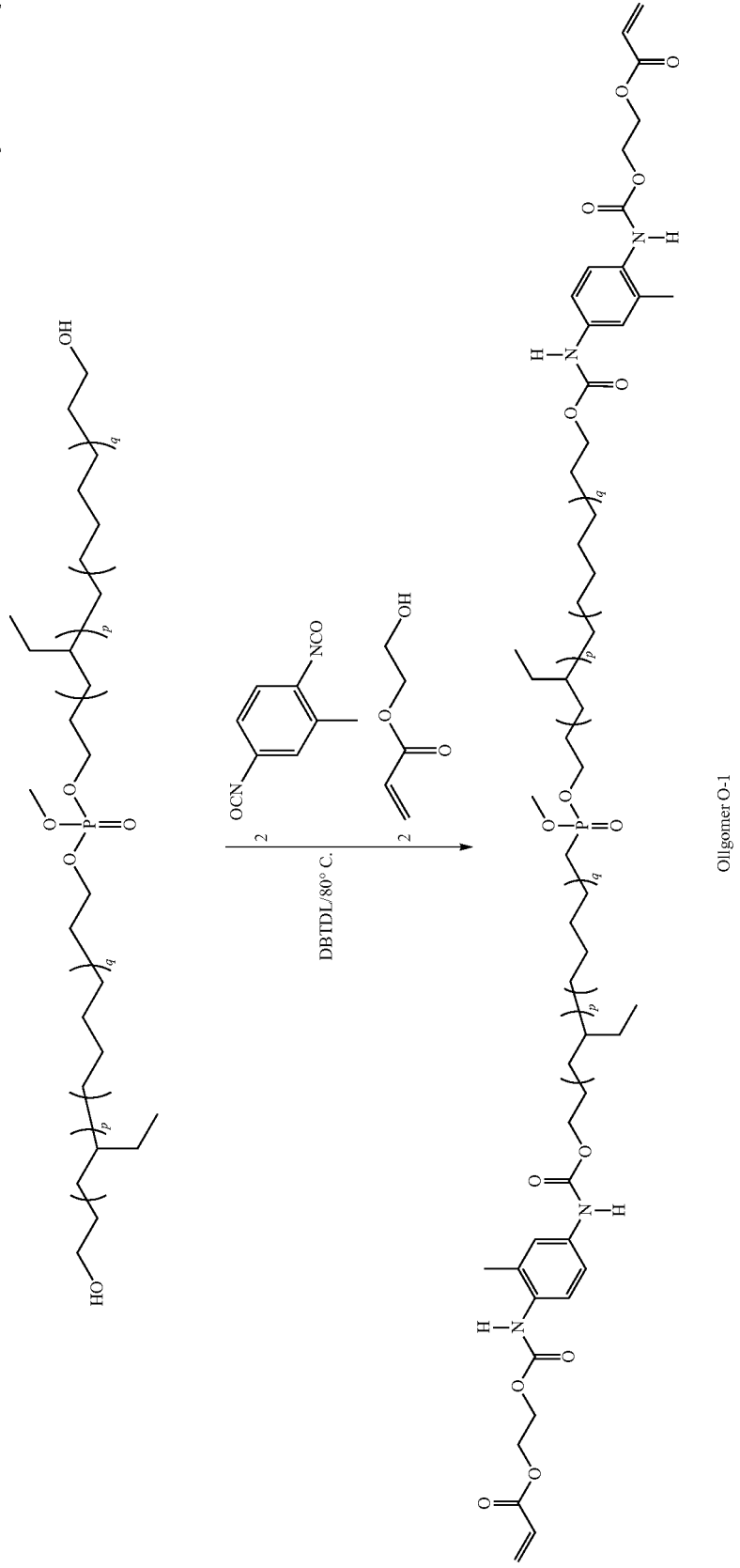
[Reaction Formula 2]

In a separable flask equipped with a cooling tube, a three-one motor, and a dry air introducing tube, 40 g of tolylene-2,4-diisocyanate (Tokyo Chemical Industry Co., Ltd.), 0.25 g of 4-methoxyphenol (Tokyo Chemical Industry Co., Ltd.), and 0.02 g of di-n-butyltin dialurate (FUJIFILM Wako Pure Chemical Corporation) were provided. 33 g of 2-hydroxyethyl acrylate was added dropwise thereto, and subjected to reaction at 80° C. for 1 hour. 350 g of phosphate-modified diol, which is an intermediate obtained in Reaction Formula 1, was added dropwise thereto, and subjected to reaction at 80° C. for 4 hours. The obtained solution was filtered, and the solvent was distilled off to obtain 380 g of urethane (meth)acrylate oligomer O-1 which is a pale yellow transparent viscous liquid. The urethane (meth)acrylate oligomer O-1 had a number average molecular weight of about 3,400.

(2) Synthesis of O-2

Urethane (meth)acrylate oligomer O-2 was synthesized and obtained in the same manner as in the synthesis of O-1, except that 28.5 g of dichloro phenylphosphate (Tokyo Chemical Industry Co., Ltd.) was used instead of dichloro methylphosphate. The urethane (meth)acrylate oligomer O-2 had a number average molecular weight of about 3,500.

(3) Synthesis of O-3

Urethane (meth)acrylate oligomer O-3 was synthesized and obtained in the same manner as in the synthesis of O-1, except that 1040 g of hydrogenated polybutadiene GI-3000 (having a number average molecular weight of about 3,100, Nippon Soda,) having hydroxyl groups bonded to both ends thereof was used instead of GI-1000. The urethane (meth) acrylate oligomer O-3 had a number average molecular weight of about 8,100.

(4) Synthesis of O-4

Urethane (meth)acrylate oligomer O-4 was synthesized and obtained in the same manner as in the synthesis of O-1, except that 1040 g of GI-3000 (having a number average molecular weight of about 3,100, Nippon Soda) was used instead of GI-1000, and 28.5 g of dichloro phenylphosphate was used instead of dichloro methylphosphate. The urethane (meth)acrylate oligomer O-4 had a number average molecular weight of about 8,200.

(5) Synthesis of O-5

Urethane (meth)acrylate oligomer O-5 was synthesized and obtained in the same manner as in the synthesis of O-1, except that 480 g of polybutadiene G-1000 (having a number average molecular weight of about 1,400, Nippon Soda) having hydroxyl groups bonded to both ends thereof was used instead of GI-1000. The urethane (meth)acrylate oligomer O-5 had a number average molecular weight of about 3,000.

(6) Synthesis of O-6

Urethane (meth)acrylate oligomer O-6 was synthesized and obtained in the same manner as in the synthesis of O-1, except that 480 g of G-1000 was used instead of GI-1000, and 28.5 g of dichloro phenylphosphate was used instead of dichloro methylphosphate. The urethane (meth)acrylate oligomer O-6 had a number average molecular weight of about 3,100.

(7) Synthesis of O-7

Urethane (meth)acrylate oligomer O-7 was synthesized and obtained in the same manner as in the synthesis of O-1, except that 790 g of polybutadiene G-3000 (having a number average molecular weight of about 3,000, Nippon Soda) having hydroxyl groups bonded to both ends thereof was used instead of GI-1000. The urethane (meth)acrylate oligomer O-7 had a number average molecular weight of about 6,100.

(8) Synthesis of O-8

Urethane (meth)acrylate oligomer O-8 was synthesized and obtained in the same manner as in the synthesis of O-1, except that 790 g of G-3000 was used instead of GI-1000, and 28.5 g of dichloro phenylphosphate was used instead of dichloro methylphosphate. The urethane (meth)acrylate oligomer O-8 had a number average molecular weight of about 6,200.

(9) Synthesis of O-9

Urethane (meth)acrylate oligomer O-9 was synthesized and obtained in the same manner as in the synthesis of O-1, except that 550 g of polyisoprene Poly-iP (having a number average molecular weight of about 2,500, Idemitsu Kosan Co., Ltd.) having hydroxyl groups bonded to both ends thereof was used instead of GI-1000. The urethane (meth) acrylate oligomer O-9 had a number average molecular weight of about 4,200.

(10) Synthesis of O-10

Urethane (meth)acrylate oligomer O-10 was synthesized and obtained in the same manner as in the synthesis of O-1, except that 550 g of Poly-iP was used instead of GI-1000, and 28.5 g of dichloro phenylphosphate was used instead of dichloro methylphosphate. The urethane (meth)acrylate oligomer O-10 had a number average molecular weight of about 4,300.

(11) Synthesis of OM-1

Urethane (meth)acrylate oligomer OM-1 was synthesized and obtained in the same manner as in the synthesis of O-1, except that 140 g of Poly-iP was used instead of phosphate-modified diol. The urethane (meth)acrylate oligomer OM-1 had a number average molecular weight of about 4,000.

Table 1 below shows O-1 to O-10, and OM-1.

TABLE 1
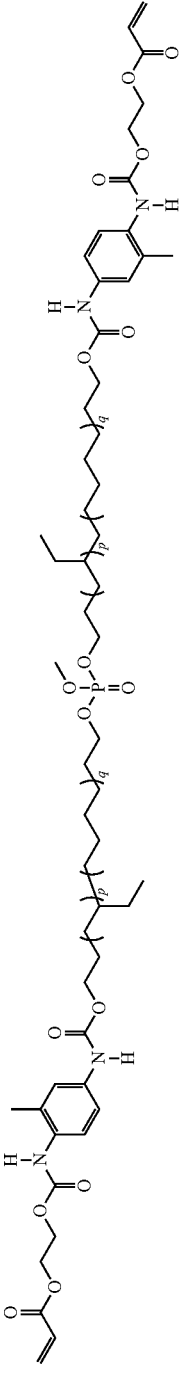
O-1: Hydrogenated polybutadiene having a number average molecular weight of about 1,500.
O-2: Hydrogenated polybutadiene having a number average molecular weight of 1,500.
O-3: Hydrogenated polybutadiene having a number average molecular weight of 3,100.
O-4: Hydrogenated polybutadiene having a number average molecular weight of 3,100.

TABLE 1-continued

| O-5 | (structure) Polybutadiene having a number average molecular weight of 1,400. |
| O-6 | (structure) Polybutadiene having a number average molecular weight of 1,400. |
| O-7 | (structure) Polybutadiene having a number average molecular weight of 3,000. |
| O-8 | (structure) Polybutadiene having a number average molecular weight of 3,000. |
| O-9 | (structure) Polybutadiene having a number average molecular weight of 3,000. |

TABLE 1-continued

O-10: Polyisoprene having a number average molecular weight of 2,500.

OM-1: Polyisoprene having a number average molecular weight of 2,500.

2. Preparation of Resin Composition

The resin compositions of Examples and Comparative Examples were prepared at the blending ratios listed in Tables 2 to 5.

Components A and B were provided in a heat-resistant, light-shielding container in the weight ratios disclosed in Tables 2 and 5, and stirred at room temperature for 12 hours using a mix rotor. After checking that the composition was uniformly stirred, component C was added thereto, and stirred at room temperature for 3 hours using a mix rotor. Component C was uniformly mixed to prepare resin compositions of Examples and Comparative Examples.

In the resin compositions of Examples and Comparative Examples, component A is a (meth)acrylate monomer, component B is a urethane (meth)acrylate oligomer, and component C is a photo initiator.

In the resin compositions of Examples 1 to 10, as component A, 2-ethylhexyl acrylate (2EHA) and 4-hydroxybutyl acrylate (4HBA) were used. In the resin compositions of Examples 1 to 10, as component B, urethane (meth)acrylate oligomers O-1 to O-10 each were used.

In the resin compositions of Comparative Examples 1 to 8, as component A, 2-ethylhexyl acrylate (2EHA) and 4-hydroxybutyl acrylate (4HBA) were used, and in the resin compositions of Comparative Examples 3 to 8, as component A, light acrylate P-1A(N) was used together with 2EHA and 4HBA. In the resin compositions of Comparative Examples 1 and 3, TEA1-1000 was used as component B. In the resin compositions of Comparative Examples 2 and 4, TE-2000 was used as component B. In the resin composition of Comparative Example 5, BAC-45 was used as component B. In the resin composition of Comparative Example 6, urethane (meth) acrylate oligomer OM-1 was used as component B. In the resin composition of Comparative Example 7, UC-102M was used as component B. In the resin composition of Comparative Example 8, component B was not used.

In the resin compositions of Examples 1 to 10 and Comparative Examples 1 to 8, Omnirad TPO-H was used as Component C.

TABLE 2

| Composition component | | Example 1 | Example 2 | Example 3 | Example 4 | Example 5 |
|---|---|---|---|---|---|---|
| A | 2EHA | 70 | 70 | 70 | 70 | 70 |
|   | 4HBA | 20 | 20 | 20 | 20 | 20 |
| B | O-1 | 10 | | | | |
|   | O-2 | | 10 | | | |
|   | O-3 | | | 10 | | |
|   | O-4 | | | | 10 | |
|   | O-5 | | | | | 10 |
| C | Omnirad TPO-H | 2 | 2 | 2 | 2 | 2 |

TABLE 3

| Composition component | | Example 6 | Example 7 | Example 8 | Example 9 | Example 10 |
|---|---|---|---|---|---|---|
| A | 2EHA | 70 | 70 | 70 | 70 | 70 |
|   | 4HBA | 20 | 20 | 20 | 20 | 20 |
| B | O-6 | 10 | | | | |
|   | O-7 | | 10 | | | |
|   | O-8 | | | 10 | | |
|   | O-9 | | | | 10 | |
|   | O-10 | | | | | 10 |
| C | Omnirad TPO-H | 2 | 2 | 2 | 2 | 2 |

TABLE 4

| Composition component | | Comparative Example 1 | Comparative Example 2 | Comparative Example 3 | Comparative Example 4 | Comparative Example 5 |
|---|---|---|---|---|---|---|
| A | 2EHA | 70 | 70 | 70 | 70 | 70 |
|   | 4HBA | 20 | 20 | 20 | 20 | 20 |
|   | Light acrylate P-1A(N) | | | 0.5 | 0.5 | 0.2 |
| B | TEAI-1000 | 10 | | 9.5 | | |
|   | TE-2000 | | 10 | | 9.5 | |
|   | BAC-45 | | | | | 9.8 |
| C | Omnirad TPO-H | 2 | 2 | 2 | 2 | 2 |

TABLE 5

| Composition component | | Comparative Example 6 | Comparative Example 7 | Comparative Example 8 |
|---|---|---|---|---|
| A | 2EHA | 70 | 70 | 70 |
|   | 4HBA | 20 | 20 | 20 |
|   | Light acrylate P-1A(N) | 0.5 | 0.1 | 10 |
| B | OM-1 | 9.5 | | |
|   | UC-102M | | 9.9 | |
| C | Omnirad TPO-H | 2 | 2 | 2 |

(Data on Substances Used as Component A)

2EHA: 2-ethylhexyl acrylate (Mitsubishi Chemical)

4HBA: 4-hydroxybutyl acrylate (Osaka Organic Chemical Industry)

Light acrylate P-1A(N): 2-acryloyloxy ethyl phosphate (KYOEISHA CHEMICAL)

(Data on Substances Used as Component B)

TEAI-1000 containing hydrogenated polybutadiene with urethane acrylate at both ends (with a number average molecular weight of about 2,000, Nippon Soda)

TE-2000 containing polybutadiene with urethane acrylate at both ends (with a number average molecular weight of about 2,500, Nippon Soda)

BAC-45 containing polybutadiene with urethane acrylate at both ends (with a number average molecular weight of about 10,000, Osaka Organic Chemical Industry)

UC-102M: Polyisoprene-containing multifunctional methacrylate (with a number average molecular weight of about 17,000, KURARAY)

(Data on Substances Used as Component C)

Omnirad TPO-H: 2,4,6-trimethylbenzoyl-diphenyl-phosphine oxide (IGM Resins)

3. Evaluation of Physical Properties of Resin Composition and Adhesive Layer Formed from the Resin Composition Tables 6 and 7 below show the evaluation of physical properties of resin compositions having the composition ratio of Tables 2 to 5 and adhesive layers formed from the resin compositions. Tables 6 and 7 show the evaluation of the compatibility of the resin compositions, the elastic modulus temperature stability and bending reliability of the adhesive layer. Compatibility, elastic modulus temperature stability, and bending reliability are evaluated as follows.

[Method of Compatibility Evaluation]

The compatibility of the resin compositions was evaluated with the naked eye. In Tables 6 and 7, compatibility "O" indicates that the resin composition is uniformly blended, compatibility "Δ" indicates that the resin composition is partially or totally suspended, and compatibility "X" indicates that the resin composition is phase separated.

[Method of elastic modulus temperature stability evaluation]

The storage modulus was measured through the method of JISK7244-6 using a viscoelasticity measuring device MCR302 (Anton-Paar). The measuring was performed through the Torsional Shear method, and the resin compositions of Examples and Comparative Examples were irradiated with 1000 mJ/cm² of UV having a wavelength of 365 nm and photocured, and the storage modulus was measured. The resin composition had a thickness of 500 μm before curing. After measuring the storage modulus at –20° C. and 60° C., the temperature stability was evaluated as shown in Equation 1 below. The measurement frequency was 1 Hz, and the heating rate was 5° C./min.

$$S_T = G'20 / G'60 \qquad \text{[Equation 1]}$$

In Equation 1, G'20 is a storage modulus value measured at –20° C., and G'60 is a storage modulus value measured at 60° C. In Tables 6 and 7, "O" refers to a case where ST values are 1 to less than 15, "Δ" refers to a case where ST values are 15 to less than 30, and "X" refers to a case where $S_T$ values are 30 or greater.

[Method of Bending Reliability Tests]

At 23° C. and 50% RH (Relative Humidity), the resin compositions of Examples and Comparative Examples were applied to one side of a polyethylene terephthalate (PET) film (thickness: 100 μm), and the provided resin compositions were covered with a separate polyethylene terephthalate film (thickness: 100 μm), and the resin compositions were subjected to a photoreaction at a light intensity of 1000 mJ/cm² of UV irradiation. The adhesive layer formed through the photoreaction was controlled to have a thickness of 10 μm. The adhesive layer prepared at 23° C. and 50% RH was left for 24 hours. The PET film/adhesive layer/PET film laminate obtained through the process was cut into 50 mm in width and 200 mm in length as a sample.

The obtained sample was repeatedly bent under the following conditions using a durability tester (Tension-Free U-shaped extension tester, Yuasa System Equipment Co. Ltd). The occurrence of lifting or delamination at an interface between the adhesive layer and the adherend (PET film), and the leakage of an adhesive from the adhesive layer of the laminate were observed with the naked eye to evaluate reliability. Bending tests were performed with a bending diameter of 3 mm at 23° C. during 30,000 times of repetitive bending.

In Tables 6 and 7, "O" indicates no lifting, delamination, and leakage of the adhesive, "Δ" indicates that some lifting of the adhesive layer and leakage of the adhesive were observed, and "X" indicates that the adherend was separated.

TABLE 6

| Item | Compatibility | Bending adhesion | Elastic modulus temperature stability $S_T$ | Storage modulus (Pa) –20° C. | 60° C. |
|---|---|---|---|---|---|
| Example 1 | O | O | O | 2.7 × 10⁵ | 3.3 × 10⁴ |
| Example 2 | O | O | O | 2.9 × 10⁵ | 3.7 × 10⁴ |
| Example 3 | O | O | O | 2.5 × 10⁵ | 1.9 × 10⁴ |
| Example 4 | O | O | O | 2.6 × 10⁵ | 2.2 × 10⁴ |
| Example 5 | O | O | O | 7.3 × 10⁵ | 1.2 × 10⁵ |
| Example 6 | O | O | O | 8.0 × 10⁵ | 1.6 × 10⁵ |
| Example 7 | O | O | O | 4.8 × 10⁵ | 5.1 × 10⁴ |
| Example 8 | O | O | O | 5.1 × 10⁵ | 6.1 × 10⁴ |
| Example 9 | O | O | O | 2.4 × 10⁵ | 2.4 × 10⁴ |
| Example 10 | O | O | O | 2.5 × 10⁵ | 2.7 × 10⁴ |

In the resin compositions of Comparative Examples 5 to 7, phase separation was observed in the compatibility evaluation, and accordingly, the bending reliability and elastic modulus temperature stability were not evaluated.

TABLE 7

| Item | Compat-ibility | Bending adhesion | Elastic modulus temperature stability $S_T$ | Storage modulus (Pa) −20° C. | Storage modulus (Pa) 60° C. |
|---|---|---|---|---|---|
| Comparative Example 1 | ○ | Δ | ○ | $3.0 \times 10^5$ | $3.5 \times 10^4$ |
| Comparative Example 2 | ○ | Δ | ○ | $4.7 \times 10^5$ | $3.7 \times 10^4$ |
| Comparative Example 3 | Δ | ○ | Δ | $9.8 \times 10^5$ | $6.1 \times 10^4$ |
| Comparative Example 4 | Δ | ○ | Δ | $1.2 \times 10^6$ | $7.0 \times 10^4$ |
| Comparative Example 5 | X | — | — | — | — |
| Comparative Example 6 | X | — | — | — | — |
| Comparative Example 7 | X | — | — | — | — |
| Comparative Example 8 | ○ | X | X | $9.7 \times 10^7$ | $2.0 \times 10^6$ |

Referring to Table 6, it is seen that Examples 1 to 10 have excellent compatibility of the resin compositions, and excellent bending reliability and elastic modulus temperature stability of the adhesive layers formed from the resin compositions. In Examples 1 to 10, it is seen that an adhesive layer formed from the resin composition has a storage modulus of about $1.0 \times 10^4$ Pa to about $1.0 \times 10^6$ Pa at −20° C. and 60° C. In Examples 1 to 10, it is seen that an adhesive layer formed from the resin composition has a storage modulus at −20° C. 1 to 15 times greater than a storage modulus at 60° C. An adhesive layer having a storage modulus at −20° C. 1 to 15 times greater than a storage modulus at 60° C. has a significant change in storage modulus according to temperature, and a display device including the adhesive layer having a significant change in storage modulus according to temperature has reduced reliability.

In Examples 1 to 10, the resin composition contains a (meth)acrylate monomer, a urethane (meth)acrylate oligomer, and a photo initiator, and the urethane (meth)acrylate oligomer contains a phosphate ester group. A phosphate ester group having a large polarity is bonded to polybutadiene, hydrogenated polybutadiene, polyisoprene, or hydrogenated polybutadiene, which have a small polarity. Accordingly, the resin composition of an embodiment containing the (meth)acrylate monomer, the urethane (meth)acrylate oligomer, and the photo initiator may exhibit satisfactory compatibility. The adhesive layer formed from the resin composition of an embodiment may exhibit excellent properties in bending reliability and elastic modulus temperature stability.

In Examples 1 to 10, when preparing a resin composition, urethane (meth)acrylate oligomers O-1 to O-10 were used. The urethane (meth)acrylate oligomers O-1 to O-10 had a number average molecular weight of about 2500 to about 10000. To be more specific, the urethane (meth)acrylate oligomers O-1 to O-10 had a number average molecular weight of about 3000 to about 8500. Accordingly, in an embodiment, an adhesive layer formed from a resin composition containing a urethane (meth)acrylate oligomer having a number average molecular weight of about 2500 to about 10000 may exhibit excellent properties in bending reliability and elastic modulus temperature stability.

Urethane (meth)acrylate oligomers O-1 and O-2 each are one that a phosphate ester group is bonded to hydrogenated polybutadiene, and the hydrogenated polybutadiene has a number average molecular weight of about 1500. Urethane (meth)acrylate oligomers O-3 and O-4 each are one that a phosphate ester group is bonded to hydrogenated polybutadiene, and the hydrogenated polybutadiene has a number average molecular weight of about 3100. Urethane (meth)acrylate oligomers O-5 and O-6 each are one that a phosphate ester group is bonded to non-hydrogenated polybutadiene, and the polybutadiene has a number average molecular weight of about 1400. Urethane (meth)acrylate oligomers O-7 and O-8 each are one that a phosphate ester group is bonded to non-hydrogenated polybutadiene, and the polybutadiene has a number average molecular weight of about 3000. Urethane (meth)acrylate oligomers O-9 and O-10 each are one that a phosphate ester group is bonded to non-hydrogenated polyisoprene, and the polyisoprene has a number average molecular weight of about 2500.

Urethane (meth)acrylate oligomers O-1, 0-3, 0-5, O-7, and O-9 are one that a methyl group is bonded to one oxygen atom of the phosphate ester group, and hydrogenated polybutadiene, polybutadiene, or polyisoprene is bonded to two oxygen atoms. Urethane (meth)acrylate oligomers O-2, 0-4, 0-6, 0-8, and O-10 are one that a phenyl group is bonded to one oxygen atom of the phosphate ester group, and hydrogenated polybutadiene, polybutadiene, or polyisoprene is bonded to two oxygen atoms. In the urethane (meth)acrylate oligomers O-1 to O-10, hydrogenated polybutadiene, polybutadiene, and polyisoprene each have a number average molecular weight of about 1000 to about 5000. To be more specific, in the urethane (meth)acrylate oligomers O-1 to O-10, hydrogenated polybutadiene, polybutadiene, and polyisoprene each have a number average molecular weight of about 1000 to about 3000. Accordingly, in an embodiment, an adhesive layer formed from a resin composition containing a urethane (meth)acrylate oligomer in which hydrogenated polybutadiene, polybutadiene, and polyisoprene each have a number average molecular weight of about 1000 to about 5000 may exhibit excellent properties in bending reliability and elastic modulus temperature stability.

In Comparative Examples 1 and 2, when preparing a resin composition, TEAI-1000 or TE-2000 in which polybutadiene or hydrogenated polybutadiene is bonded to urethane (meth)acrylate containing no phosphate ester group was used. In Comparative Examples 1 and 2, when evaluating the bending reliability of the adhesive layer, lifting was observed at a portion of the adhesive layer.

In Comparative Examples 3 and 4, when preparing a resin composition, similar to Comparative Examples 1 and 2, TEAI-1000 or TE-2000 in which polybutadiene or hydrogenated polybutadiene is bonded to urethane (meth)acrylate containing no phosphate ester group was used, and light acrylate P-1A(N) containing an acidic ester group was used. In Comparative Examples 3 and 4, when evaluating the compatibility of the resin composition, the suspension of the resin composition was observed over time. In Comparative Examples 3 and 4, an adhesive layer formed from the resin composition has a storage modulus at −20° C. 1 to 15 times greater than a storage modulus at 60° C. In Comparative Examples 3 and 4, it is determined that since the urethane (meth)acrylate used in the preparation of the resin composition contains no phosphate ester group, the polarity of polybutadiene or hydrogenated polybutadiene has a relatively greater effect. Accordingly, in Comparative Examples 3 and 4, it is determined that the adhesive layer formed from the resin composition has a significant change in storage modulus according to temperature.

In Comparative Example 5, when preparing a resin composition, acrylate BAC-45 without containing a urethane bond was used, and the acrylate contained polybutadiene. In Comparative Example 5, when evaluating the compatibility of the resin composition, phase separation between light acrylate P-1A(N) and BAC-45 was observed.

In Comparative Examples 6 and 7, when preparing a resin composition, acrylate OM-1 containing polyisoprene or meta acrylate UC-102M containing polyisoprene were used, and light acrylate P-1A(N) was additionally used. In Comparative Examples 6 and 7, when evaluating the compatibility of the adhesive layer formed from the resin composition, phase separation was observed.

In Comparative Example 8, when preparing a resin composition, an oligomer was not used, and the oligomer was replaced with light acrylate P-1A(N). In Comparative Example 8, when evaluating the bending reliability of the adhesive layer formed from the resin composition, buckling was observed. It is determined that light acrylate P-1A(N) caused buckling. In Comparative Example 8, it is seen that the adhesive layer formed from the resin composition had a significant change in storage modulus according to temperature. In Comparative Example 8, it is determined that the adhesive layer formed from the resin composition did not have a molecular crosslinking point, thereby causing the significant change in storage modulus according to temperature, The resin composition of an embodiment may include a (meth)acrylate monomer, a urethane (meth)acrylate oligomer, and a photo initiator. The urethane (meth)acrylate oligomer may be one that a phosphate ester group is bonded to polybutadiene, hydrogenated polybutadiene, polyisoprene, or hydrogenated polyisoprene. Accordingly, the resin composition of an embodiment may exhibit satisfactory compatibility.

The display device according to an embodiment includes an adhesive layer disposed between the display panel and the window, and the adhesive layer may be formed from the resin composition of an embodiment. The adhesive layer formed from the resin composition of an embodiment may contribute to maintaining reliability of the display device when the display device is repeatedly folded and unfolded.

A resin composition according to an embodiment includes an oligomer in which a phosphate ester group is applied to a polybutadiene or polyisoprene skeleton, and may thus exhibit excellent elastic modulus and adhesion after curing.

A display device according to an embodiment includes an adhesive layer formed from a resin composition, and may thus exhibit satisfactory reliability.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:
1. A resin composition comprising:
at least one (meth)acrylate monomer;
a urethane (meth)acrylate oligomer represented by Formula 1 below; and
at least one photo initiator,

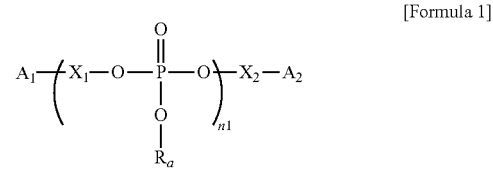

[Formula 1]

wherein in Formula 1,
n1 is an integer from 1 to 25,
$X_1$ and $X_2$ are each independently a polybutadiene, a hydrogenated polybutadiene, a polyisoprene, or a hydrogenated polyisoprene,
$R_a$ is a substituted or unsubstituted alkyl group having 1 to 10 carbon atoms or a substituted or unsubstituted aryl group having 6 to 20 ring-forming carbon atoms, and
$A_1$ and $A_2$ are each independently a group represented by Formula 2:

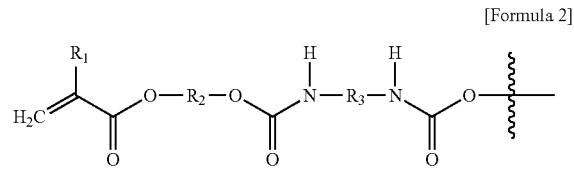

[Formula 2]

wherein in Formula 2,
$R_1$ is a hydrogen atom or a substituted or unsubstituted alkyl group having 1 to 6 carbon atoms,
$R_2$ is a substituted or unsubstituted alkoxy group, a substituted or unsubstituted divalent alkyl group having 1 to 10 carbon atoms, a substituted or unsubstituted divalent alkenyl group having 2 to 10 carbon atoms, or a substituted or unsubstituted divalent alkynyl group having 2 to 10 carbon atoms,
$R_3$ is a substituted or unsubstituted divalent alkyl group having 1 to 15 carbon atoms or a substituted or unsubstituted divalent aryl group having 6 to 20 carbon atoms, and

represents a binding site to a neighboring atom.
2. The resin composition of claim 1, wherein the urethane (meth)acrylate oligomer has a number average molecular weight in a range of about 2,500 to about 30,000.
3. The resin composition of claim 1, wherein $X_1$ and $X_2$ each independently have a number average molecular weight in a range of about 1,000 to about 5,000.

4. The resin composition of claim 1, wherein $X_1$ and $X_2$ are each independently a group represented by one of Formulas X-1 to X-3:

[Formula X-1]

[Formula X-2]

[Formula X-3]

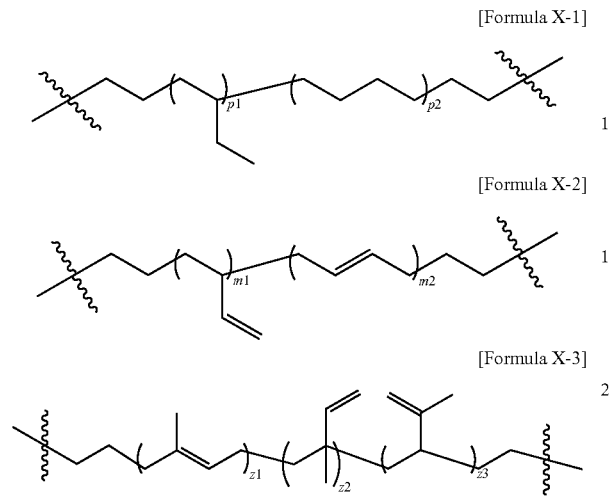

wherein in Formula X-1,
p1 and p2 are each independently an integer from 0 to 87, and
the sum of p1 and p2 is 17 to 88,
wherein in Formula X-2,
m1 and m2 are each independently an integer from 0 to 90, and
the sum of m1 and m2 is 17 to 90,
wherein in Formula X-3,
z1 and z2 are each independently an integer from 0 to 71,
z3 is an integer from 0 to 90, and
the sum of z1, z2, and z3 is 14 to 71, and
wherein in Formula X-1 to X-3,

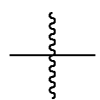

represents a binding site to a neighboring atom.

5. The resin composition of claim 1, wherein $X_1$ and $X_2$ are the same.

6. The resin composition of claim 1, wherein, after UV curing,
the resin composition has a storage modulus in a range of about $1.0 \times 10^4$ Pa to about $1.0 \times 10^6$ Pa at about $-20°$ C., and
the resin composition has a storage modulus in a range of about $1.0 \times 10^4$ Pa to about $1.0 \times 10^6$ Pa at about $60°$ C.

7. The resin composition of claim 1, wherein, after UV curing,
the resin composition has a storage modulus at about $-20°$ C. that is about 1 to about 15 times greater than a storage modulus at about $60°$ C.

8. The resin composition of claim 1, wherein an amount of the (meth)acrylate monomer in the resin composition is in a range of about 65 wt % to about 94 wt %, with respect to a total amount of the resin composition.

9. The resin composition of claim 1, wherein an amount of the urethane (meth)acrylate oligomer in the resin composition is in a range of about 5 wt % to about 30 wt %, with respect to a total amount of the resin composition.

10. The resin composition of claim 1, wherein an amount of the photo initiator in the resin composition is in a range of about 0.5 wt % to about 5 wt %, with respect to a total amount of the resin composition.

11. The resin composition of claim 1, wherein the (meth)acrylate monomer contains at least one of 2-ethylhexyl acrylate and 4-hydroxybutyl acrylate.

12. A display device comprising:
a display module including a display panel;
a window disposed on the display panel; and
an adhesive layer disposed between the display panel and the window, wherein
the adhesive layer includes a polymer derived from a resin composition that includes:
at least one (meth)acrylate monomer;
a urethane (meth)acrylate oligomer represented by Formula 1; and
at least one photo initiator,

[Formula 1]

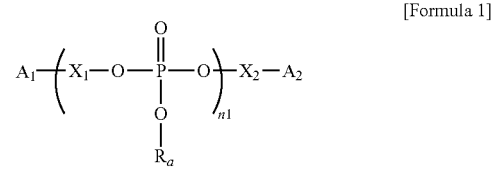

wherein in Formula 1,
n1 is an integer from 1 to 25,
$X_1$ and $X_2$ are each independently polybutadiene, hydrogenated polybutadiene, polyisoprene, or hydrogenated polyisoprene,
$R_a$ is a substituted or unsubstituted alkyl group having 1 to 10 carbon atoms or a substituted or unsubstituted aryl group having 6 to 20 ring-forming carbon atoms, and
$A_1$ and $A_2$ are each independently a group represented by Formula 2:

[Formula 2]

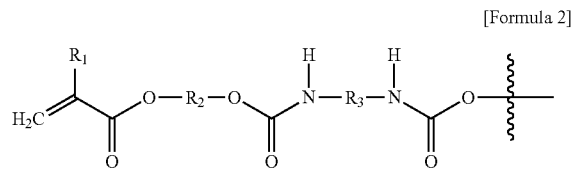

wherein in Formula 2,
$R_1$ is a hydrogen atom or a substituted or unsubstituted alkyl group having 1 to 6 carbon atoms,
$R_2$ is a substituted or unsubstituted alkoxy group, a substituted or unsubstituted divalent alkyl group having 1 to 10 carbon atoms, a substituted or unsubstituted divalent alkenyl group having 2 to 10 carbon atoms, or a substituted or unsubstituted divalent alkynyl group having 2 to 10 carbon atoms,
$R_3$ is a substituted or unsubstituted divalent alkyl group having 1 to 15 carbon atoms or a substituted or unsubstituted divalent aryl group having 6 to 20 carbon atoms, and

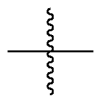

represents a binding site to a neighboring atom.

13. The display device of claim 12, wherein the urethane (meth)acrylate oligomer has a number average molecular weight in a range of about 2,500 to about 30,000.

14. The display device of claim 12, wherein
the adhesive layer has a storage modulus in a range of about $1.0\times10^4$ Pa to about $1.0\times10^6$ Pa at about $-20°$ C., and
the adhesive layer has a storage modulus in a range of about $1.0\times10^4$ Pa to about $1.0\times10^6$ Pa at about $60°$ C.

15. The display device of claim 12, wherein the adhesive layer has a storage modulus at about $-20°$ C. that is about 1 to about 15 times greater than a storage modulus at about $60°$ C.

16. The display device of claim 12, wherein the adhesive layer has a thickness in a range of about 10 μm to about 200 μm.

17. The display device of claim 12, further comprising an input sensor disposed on the display panel, wherein
the adhesive layer is disposed between the display panel and the input sensor or between the input sensor and the window.

18. The display device of claim 12, wherein
the display device comprises at least one folding area, and
the folding area has a radius of curvature equal to or less than about 5 mm.

19. The display device of claim 12, further comprising:
a light control layer disposed between the adhesive layer and the window; and
an optical adhesive layer disposed between the light control layer and the window, wherein
the optical adhesive layer includes a polymer derived from the resin composition.

20. The display device of claim 12, wherein the adhesive layer is formed by:
providing the resin composition directly on a surface of the window or directly on a surface of the display module, and
UV curing the provided resin composition.

* * * * *